United States Patent
Master et al.

(10) Patent No.: US 7,802,108 B1
(45) Date of Patent: Sep. 21, 2010

(54) SECURE STORAGE OF PROGRAM CODE FOR AN EMBEDDED SYSTEM

(75) Inventors: Paul L. Master, Sunnyvale, CA (US); Eric Murray, Los Gatos, CA (US); Joseph Mehegan, San Jose, CA (US); Robert Thomas Plunkett, Sunnyvale, CA (US)

(73) Assignee: NVIDIA Corporation, Santa Clara, CA (US)

(*) Notice: Subject to any disclaimer, the term of this patent is extended or adjusted under 35 U.S.C. 154(b) by 912 days.

(21) Appl. No.: 10/286,633

(22) Filed: Nov. 1, 2002

Related U.S. Application Data

(63) Continuation-in-part of application No. 10/199,923, filed on Jul. 18, 2002.

(51) Int. Cl.
*G06F 11/30* (2006.01)
*G06F 12/14* (2006.01)

(52) U.S. Cl. ........... 713/193; 327/545; 711/163; 711/164

(58) Field of Classification Search ............ 713/193
See application file for complete search history.

(56) References Cited

U.S. PATENT DOCUMENTS

| | | | |
|---|---|---|---|
| 4,879,707 A * | 11/1989 | Getreuer et al. ......... 369/44.28 |
| 5,123,045 A * | 6/1992 | Ostrovsky et al. ......... 713/190 |
| 5,450,557 A | 9/1995 | Kopp et al. |
| 5,533,123 A * | 7/1996 | Force et al. ......... 713/189 |
| 5,572,572 A | 11/1996 | Kawan et al. |
| 5,646,544 A | 7/1997 | Iadanza |
| 5,696,823 A * | 12/1997 | Blaze ......... 380/279 |
| 5,737,631 A | 4/1998 | Trimberger |
| 5,828,858 A | 10/1998 | Athanas et al. |
| 5,860,021 A | 1/1999 | Klingman |
| 5,883,956 A * | 3/1999 | Le et al. ......... 713/170 |
| 5,889,816 A | 3/1999 | Agrawal et al. |
| 5,892,900 A | 4/1999 | Ginter et al. |
| 5,892,961 A | 4/1999 | Trimberger |
| 5,907,580 A | 5/1999 | Cummings |
| 5,910,733 A | 6/1999 | Bertolet et al. |
| 5,940,438 A | 8/1999 | Poon et al. |
| 5,943,242 A | 8/1999 | Vorbach et al. |
| 5,959,881 A | 9/1999 | Trimberger et al. |
| 5,963,048 A | 10/1999 | Harrison et al. |
| 5,966,534 A | 10/1999 | Cooke et al. |
| 5,970,254 A | 10/1999 | Cooke et al. |
| 5,994,923 A * | 11/1999 | Navabi ......... 326/89 |
| 6,021,186 A | 2/2000 | Suzuki et al. |
| 6,021,490 A | 2/2000 | Vorbach et al. |
| 6,023,742 A | 2/2000 | Ebeling et al. |
| 6,061,580 A | 5/2000 | Altschul et al. |

(Continued)

OTHER PUBLICATIONS

Mannion, Patrick. "Acquired Startup Tips Reconfigurable Architecture," EE Times, Aug. 11, 2000, Issue 1126.

(Continued)

*Primary Examiner*—Farid Homayounmehr
(74) *Attorney, Agent, or Firm*—Patterson & Sheridan, LLP

(57) ABSTRACT

Aspects for securely storing program code of an embedded system includes accepting a digitation file from a distribution source into on-chip memory of an adaptive computing engine (ACE). The digitation file is then secured and transferred to off-chip memory.

15 Claims, 6 Drawing Sheets

U.S. PATENT DOCUMENTS

| | | | |
|---|---|---|---|
| 6,081,903 | A | 6/2000 | Vorbach et al. |
| 6,088,043 | A | 7/2000 | Kelleher et al. |
| 6,094,065 | A | 7/2000 | Tavana et al. |
| 6,101,255 | A * | 8/2000 | Harrison et al. ............... 380/52 |
| 6,119,181 | A | 9/2000 | Vorbach et al. |
| 6,120,551 | A | 9/2000 | Law et al. |
| 6,122,670 | A | 9/2000 | Bennett et al. |
| 6,150,838 | A | 11/2000 | Wittig et al. |
| 6,195,788 | B1 | 2/2001 | Leaver et al. |
| 6,230,307 | B1 | 5/2001 | Davis et al. |
| 6,237,029 | B1 | 5/2001 | Master et al. |
| 6,256,724 | B1 * | 7/2001 | Hocevar et al. ............... 712/35 |
| 6,266,760 | B1 | 7/2001 | DeHon et al. |
| 6,282,627 | B1 | 8/2001 | Wong et al. |
| 6,282,651 | B1 * | 8/2001 | Ashe .......................... 713/193 |
| 6,311,149 | B1 | 10/2001 | Ryan et al. |
| 6,338,106 | B1 | 1/2002 | Vorbach et al. |
| 6,353,841 | B1 | 3/2002 | Marshall et al. |
| 6,385,727 | B1 * | 5/2002 | Cassagnol et al. ........... 713/193 |
| 6,405,299 | B1 | 6/2002 | Vorbach et al. |
| 6,408,039 | B1 | 6/2002 | Ito |
| 6,410,941 | B1 | 6/2002 | Taylor et al. |
| 6,425,068 | B1 | 7/2002 | Vorbach et al. |
| 6,433,578 | B1 | 8/2002 | Wasson |
| 6,480,937 | B1 | 11/2002 | Vorbach et al. |
| 6,542,998 | B1 | 4/2003 | Vorbach et al. |
| 6,545,983 | B2 * | 4/2003 | Belaiche .................... 370/252 |
| 6,571,381 | B1 | 5/2003 | Vorbach et al. |
| 6,640,304 | B2 | 10/2003 | Ginter et al. |
| 6,675,298 | B1 * | 1/2004 | Folmsbee .................. 713/190 |
| 6,697,948 | B1 | 2/2004 | Rabin et al. |
| 6,697,979 | B1 | 2/2004 | Vorbach et al. |
| 6,718,319 | B1 * | 4/2004 | Fisher et al. .................... 707/1 |
| 6,732,105 | B1 | 5/2004 | Watson, Jr. et al. |
| 6,751,729 | B1 | 6/2004 | Giniger et al. |
| 6,754,784 | B1 * | 6/2004 | North et al. .................. 711/145 |
| 6,757,831 | B1 * | 6/2004 | Folmsbee .................... 713/190 |
| 6,766,353 | B1 | 7/2004 | Lin et al. |
| 6,820,203 | B1 * | 11/2004 | Okaue et al. ................. 713/193 |
| 6,847,948 | B1 | 1/2005 | Paolini et al. |
| 6,889,212 | B1 | 5/2005 | Wang et al. |
| 6,968,454 | B2 * | 11/2005 | Master et al. ................ 713/168 |
| 6,976,136 | B2 * | 12/2005 | Falik et al. .................. 711/152 |
| 7,003,660 | B2 | 2/2006 | Vorbach et al. |
| 7,043,611 | B2 * | 5/2006 | McClannahan et al. ..... 711/154 |
| 7,117,333 | B2 * | 10/2006 | Beeston et al. .............. 711/170 |
| 7,127,619 | B2 * | 10/2006 | Unger et al. ................. 713/193 |
| 7,197,645 | B2 * | 3/2007 | Sambhwani et al. ........ 713/179 |
| 7,210,129 | B2 | 4/2007 | May et al. |
| 7,257,718 | B2 * | 8/2007 | Lundvall et al. ............. 713/193 |
| 7,266,725 | B2 | 9/2007 | Vorbach et al. |
| 7,356,710 | B2 * | 4/2008 | Lundvall et al. ............ 713/193 |
| 7,394,284 | B2 | 7/2008 | Vorbach |
| 7,434,191 | B2 | 10/2008 | Vorbach et al. |
| 7,444,531 | B2 | 10/2008 | Vorbach et al. |
| 7,664,261 | B2 * | 2/2010 | Lee et al. .................... 380/200 |
| 2003/0188182 | A1 * | 10/2003 | Sato et al. ................... 713/193 |
| 2007/0094468 | A1 * | 4/2007 | Haustein et al. ............. 711/163 |

OTHER PUBLICATIONS

Souza, Crista. "Quicksilver Buys DSP Design House White Eagle." Electronic Buyers News, Jul. 17, 2000, Issue 1220.

Dipert, Brian. "Figuring Out Reconfigurable Logic," EDN, Aug. 5, 1999, vol. 44, Issue 16.

Souza, Crista. "Reconfigurability Puts New Face on Computing," Electronic Buyers' News, Apr. 3, 2000, Issue 1205.

\* cited by examiner

US 7,802,108 B1

SECURE STORAGE OF PROGRAM CODE FOR AN EMBEDDED SYSTEM

CROSS-REFERENCE TO RELATED APPLICATION

This is a continuation-in-part of application Ser. No. 10/199,923 filed on Jul. 18, 2002, and is claiming the benefit of that application under 35 USC §120.

FIELD OF THE INVENTION

The present invention relates to secure storage of program code for an embedded system.

BACKGROUND OF THE INVENTION

The electronics industry has become increasingly driven to meet the demands of high-volume consumer applications, which comprise a majority of the embedded systems market. Embedded systems face challenges in producing performance with minimal delay, minimal power consumption, and at minimal cost. As the numbers and types of consumer applications where embedded systems are employed increases, these challenges become even more pressing. Examples of consumer applications where embedded systems are employed include handheld devices, such as cell phones, personal digital assistants (PDAs), global positioning system (GPS) receivers, digital cameras, etc. By their nature, these devices are required to be small, low-power, light-weight, and feature-rich.

Given the small size of these devices, the amount of storage space can be limited within the device. The use of storage external to the device is one approach to avoiding such limitations. However, transferring data to and from the device to external storage raises potential security issues, not only with regard to the tampering of the data being transferred but also with regard to the possibility of the data being accessed by another unauthorized user. Accordingly, a need exists for ensuring privacy and integrity of data moved from on-chip storage of an embedded system to off-chip storage. The present invention addresses such a need.

SUMMARY OF THE INVENTION

Aspects for securely storing program code of an embedded system includes accepting to a digitation file from a distribution source into on-chip memory of an adaptive computing engine (ACE). The digitation file is then secured and transferred to off-chip memory.

Through the present invention, potential tampering and unauthorized access of program code for an adaptable computing device is avoided as the data is moved to/from off-chip memory. These and other advantages will become readily apparent from the following detailed description and accompanying drawings.

DETAILED DESCRIPTION OF THE INVENTION

The present invention relates to secure storage of program code for an embedded system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is described for particular applicability to an environment in which an electronic product is provided as two separate consumer items, an adaptive silicon foundation and a digitation file. The adaptive silicon foundation allows for a blank slate onto which a desired hardware designation and software application are applied via the digitation file. Thus, the distinction between software and hardware becomes negligible, as the adaptive silicon remains seemingly useless until the application of the digitation file to the adaptive silicon commences. The present invention relates to the aspects of distribution of the digitation file in a manner that allows for the separation of the responsibility of distribution and licensing and of authentication and encryption, while ensuring product security and integrity with proper revenue generation and notification when providing a consumer product.

Figure 1A:
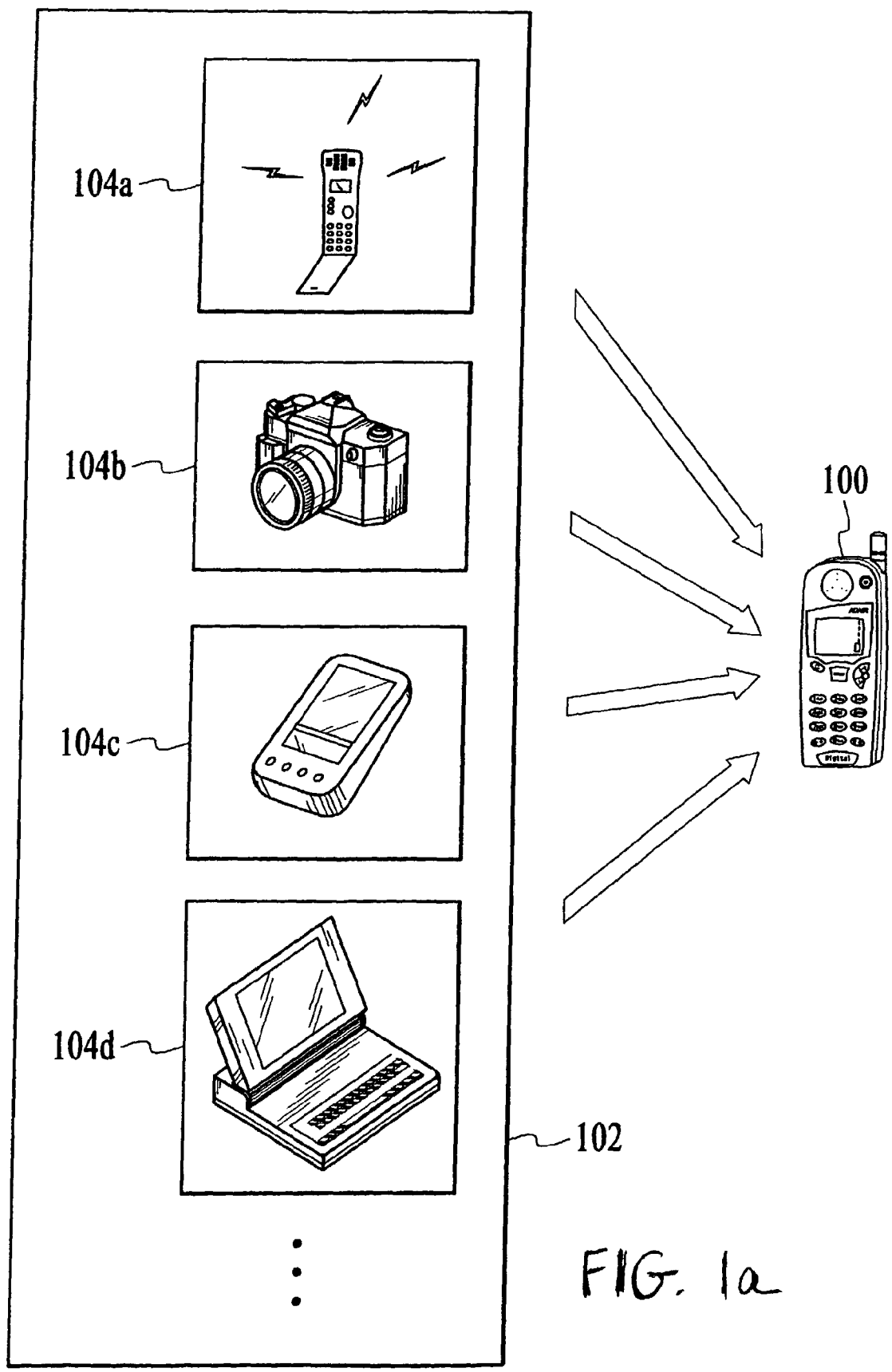
FIGS. 1a and 1b illustrate a preferred embodiment of providing a consumer product in accordance with the present invention.
Figure 1B:
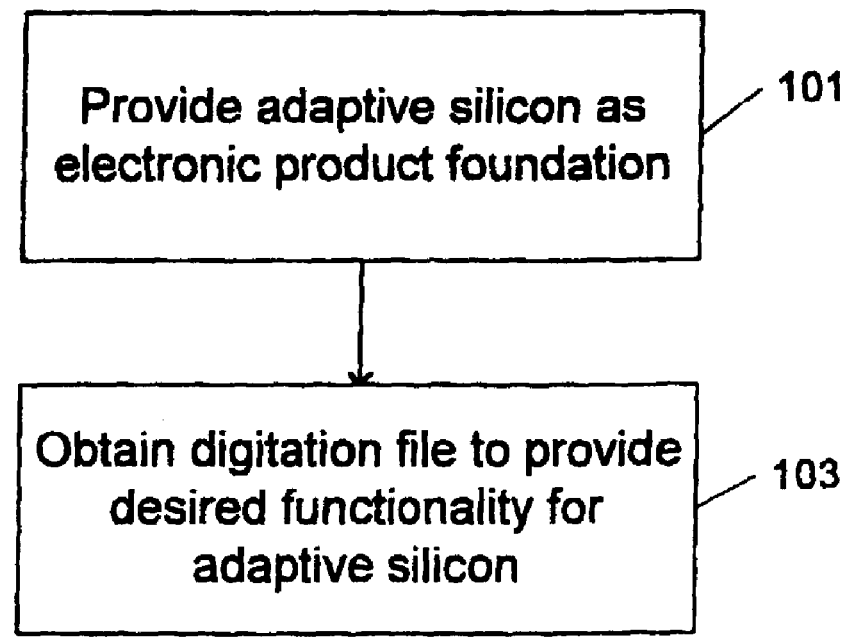

FIGS. 1a and 1b illustrate providing a consumer product in accordance with the present invention. Referring concurrently to FIGS. 1a and 1b, in a preferred embodiment, the adaptive silicon is presented as a consumer product 100 in the form of a handheld device (step 101). In order to provide the desired functionality into the product 100, a desired digitation file is obtained (step 103). As represented by FIG. 1a, in an exemplary embodiment, the desired digitation file may include one of a plurality of digitation files, each of which is accessible from a computer readable medium 102, such as files on a computer server, e.g., a digitation file 104a to configure the product as a cellular phone; a digitation file 104b to configure the product as a PDA (personal digital assistant); a digitation file 104c to configure the product as a calculator; and a digitation file 104d to configure the product as a digital camera. Of course, the types of consumer products and digitation files described are meant to be illustrative and not restrictive of the types, so that further future developments for handheld electronic devices are also expected to be able to be applicable to the aspects of the present invention. Further, the procurement of the desired digitation file occurs by any suitable method that allows a consumer to download or otherwise apply the digitation file onto the adaptive silicon. Additionally, the download may include updates to a particular configuration rather than a change to a new configuration.

By the nature of the digitation file providing the hardware designation and software application for the adaptive silicon, the value of the actual silicon performing the operations of the product is relative to the value of the digitation file. This represents a shift from the typical paradigm of consumer products, where the silicon hardware often is designed to perform the particular function of the device, as in an ASIC approach, and thus, the silicon hardware bears the value and the costs associated with the device. In contrast, with the present invention, the cost of the silicon becomes of much less significance, while the digitation file bears more of the value and the costs associated with the device.

In a preferred embodiment, the adaptive silicon is provided as an adaptive computing engine (ACE). A more detailed discussion of the aspects of an ACE are provided in co-pending U.S. patent application Ser. No. 09/815,122 entitled "Adaptive Integrated Circuitry with Heterogeneous and Reconfigurable Matrices of Diverse and Adaptive Computational Units Having Fixed, Application Specific Computational Elements," filed Mar. 22, 2001, and assigned to the assignee of the present invention. Portions of that discussion are presented in the following in order to more fully illustrate the aspects of the present invention.

Figure 2:
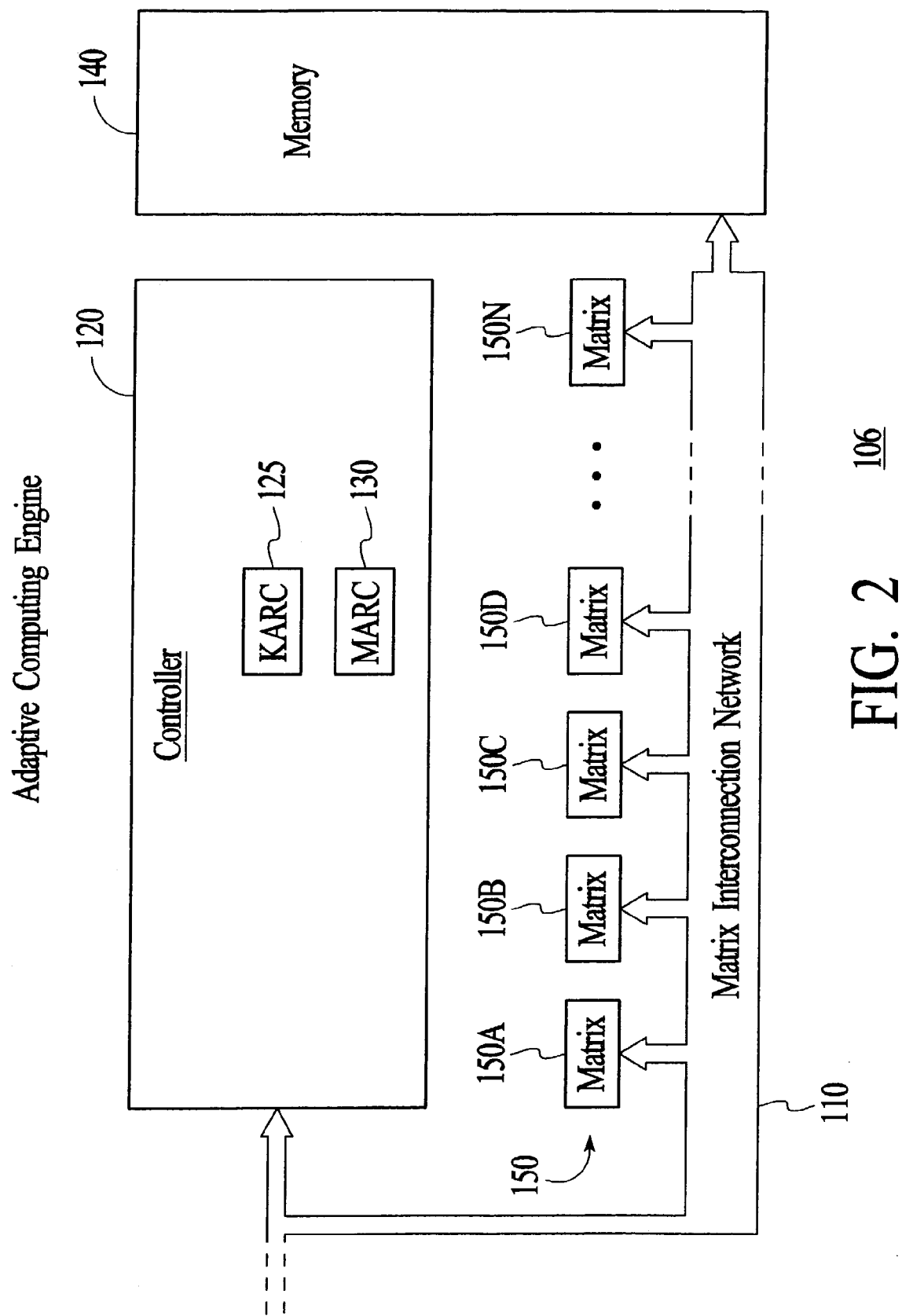
FIG. 2 is a block diagram illustrating an adaptive computing engine.

FIG. 2 is a block diagram illustrating an adaptive computing engine ("ACE") 106 that includes a controller 120, one or more reconfigurable matrices 150, such as matrices 150A through 150N as illustrated, a matrix interconnection network 110, and preferably also includes a memory 140.

Figure 3:
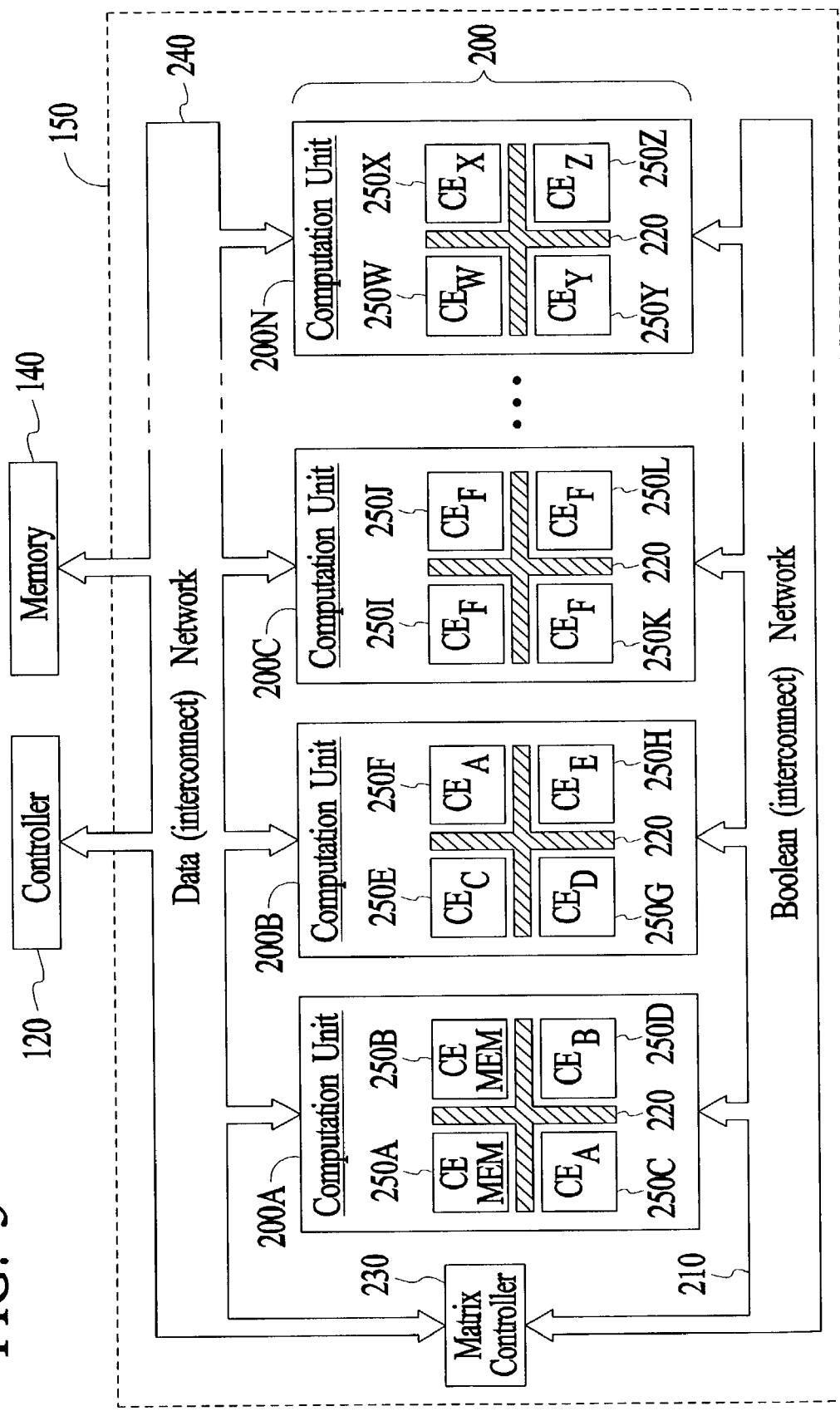
FIG. 3 is a block diagram illustrating, in greater detail, a reconfigurable matrix of the adaptive computing engine.

FIG. 3 is a block diagram illustrating, in greater detail, a reconfigurable matrix 150 with a plurality of computation units 200 (illustrated as computation units 200A through 200N), and a plurality of computational elements 250 (illustrated as computational elements 250A through 250Z), and provides additional illustration of the preferred types of computational elements 250 and a useful summary of aspects of the present invention. As illustrated in FIG. 3, any matrix 150 generally includes a matrix controller 230, a plurality of computation (or computational) units 200, and as logical or conceptual subsets or portions of the matrix interconnect network 110, a data interconnect network 240 and a Boolean interconnect network 210. The Boolean interconnect network 210, as mentioned above, provides the reconfigurable interconnection capability between and among the various computation units 200, while the data interconnect network 240 provides the reconfigurable interconnection capability for data input and output between and among the various computation units 200. It should be noted, however, that while conceptually divided into reconfiguration and data capabilities, any given physical portion of the matrix interconnection network 110, at any given time, may be operating as either the Boolean interconnect network 210, the data interconnect network 240, the lowest level interconnect 220 (between and among the various computational elements 250), or other input, output, or connection functionality.

Continuing to refer to FIG. 3, included within a computation unit 200 are a plurality of computational elements 250, illustrated as computational elements 250A through 250Z (collectively referred to as computational elements 250), and additional interconnect 220. The interconnect 220 provides the reconfigurable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be reconfigurably connected together to execute an algorithm or other function, at any given time.

In a preferred embodiment, the various computational elements 250 are designed and grouped together, into the various reconfigurable computation units 200. In addition to computational elements 250 which are designed to execute a particular algorithm or function, such as multiplication, other types of computational elements 250 are also utilized in the preferred embodiment. As illustrated in FIG. 3, computational elements 250A and 250B implement memory, to provide local memory elements for any given calculation or processing function (compared to the more "remote" memory 140). In addition, computational elements 250I, 250J, 250K and 250L are configured (using, for example, a plurality of flip-flops) to implement finite state machines, to provide local processing capability, especially suitable for complicated control processing.

With the various types of different computational elements 250, which may be available, depending upon the desired functionality of the ACE 106, the computation units 200 may be loosely categorized. A first category of computation units 200 includes computational elements 250 performing linear operations, such as multiplication, addition, finite impulse response filtering, and so on. A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 3, particularly useful for complicated control sequences, dynamic scheduling, and input/output management, while a fourth type may implement memory and memory management, such as computation unit 200A as illustrated in FIG. 3. Lastly, a fifth type of computation unit 200 may be included to perform digitation-level manipulation, such as for encryption, decryption, channel coding, Viterbi decoding, and packet and protocol processing (such as Internet Protocol processing).

Figure 4:
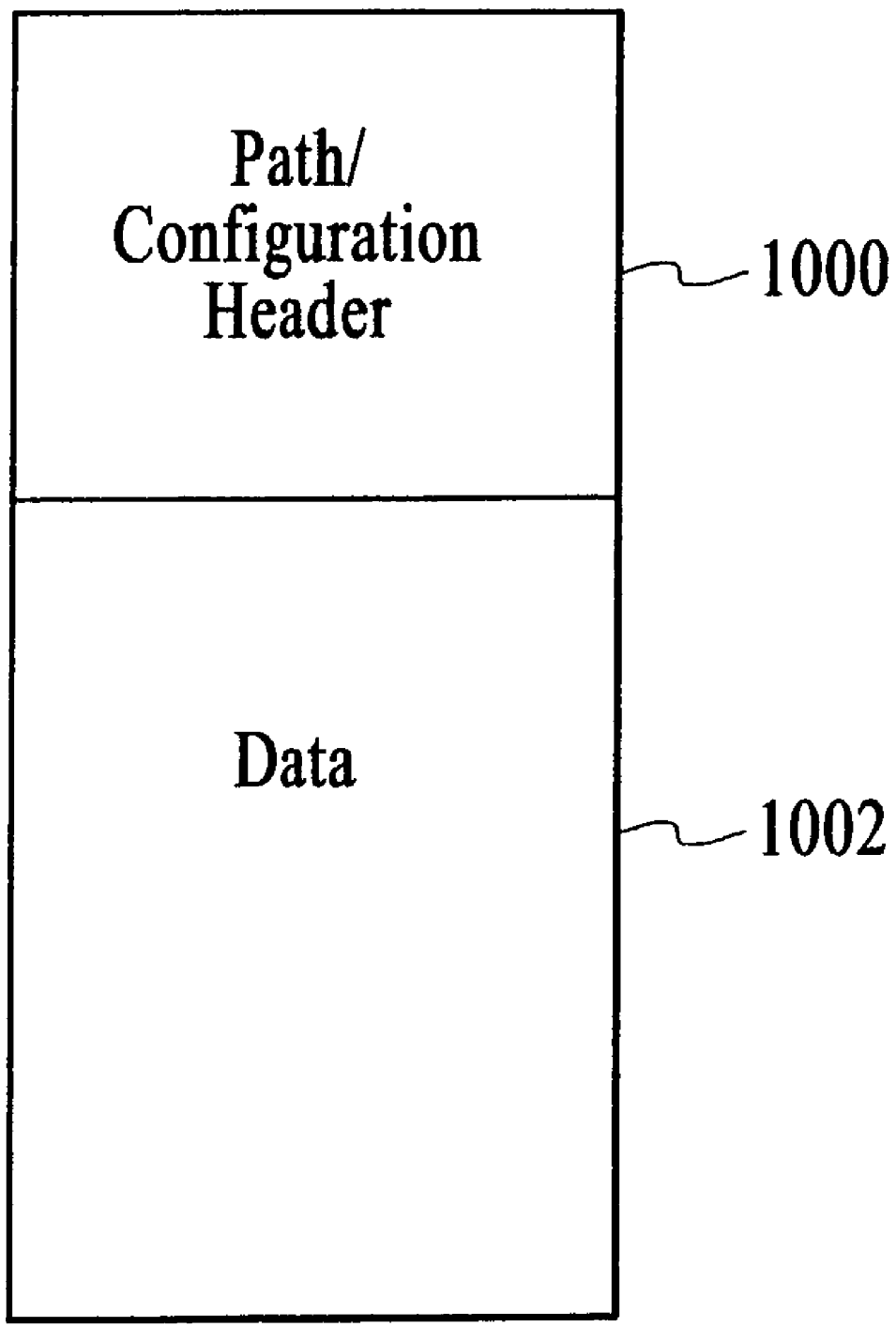
FIG. 4 illustrates a diagram of a digitation file in accordance with the present invention.

Next, a digitation file represents a tight coupling (or inter-digitation) of data and configuration (or other control) information, within one, effectively continuous stream of information. As illustrated in the diagram of FIG. 4, the continuous stream of data can be characterized as including a first portion 1000 that provides adaptive instructions and configuration data and a second portion 1002 that provides data to be processed. This coupling or commingling of data and configuration information is referred to as a "silverware" module and helps to enable real-time reconfigurability of the ACE 106. For example, as an analogy, a particular configuration of computational elements, as the hardware to execute a corresponding algorithm, may be viewed or conceptualized as a hardware analog of "calling" a subroutine in software that may perform the same algorithm. As a consequence, once the configuration of the computational elements has occurred, as directed by the configuration information, the data for use in the algorithm is immediately available as part of the silverware module. The immediacy of the data, for use in the configured computational elements, provides a one or two clock cycle hardware analog to the multiple and separate software steps of determining a memory address and fetching stored data from the addressed registers. This has the further result of additional efficiency, as the configured computational elements may execute, in comparatively few clock cycles, an algorithm which may require orders of magnitude more clock cycles for execution if called as a subroutine in a conventional microprocessor or DSP.

This use of silverware modules, as a commingling of data and configuration information, in conjunction with the real-time reconfigurability of heterogeneous and fixed computational elements 250 to form different and heterogeneous computation units 200 and matrices 150, enables the ACE 100 architecture to have multiple and different modes of operation. For example, when included within a hand-held device, given a corresponding silverware module, the ACE 100 may have various and different operating modes as a cellular or other mobile telephone, a music player, a pager, a personal digital assistant, and other new or existing functionalities. In addition, these operating modes may change based upon the physical location of the device; for example, when configured as a CDMA mobile telephone for use in the United States, the ACE 100 may be reconfigured as a GSM mobile telephone for use in Europe.

With the adaptability of the ACE 100 based on the silverware, ensuring against rogue silverware is vital to maintaining proper device functionality. The aforementioned cross-referenced patent application discusses a network that allows for the distribution of the silverware in a manner that ensures security and integrity of the data transfer from a distribution source to an ACE. The present invention addresses a further issue of security arising once the silverware has been accepted by an ACE 100.

Once accepted (i.e., decrypted and verified) and licensed, the silverware is available for utilization by the ACE 100. As the size of silverware generally exceeds the on-chip memory 140 of the ACE 100, and as processing functions are not needed by the ACE 100, the availability of the silverware is maintained through storage of the silverware from chip program memory to off-chip storage, e.g., computer readable medium storage in a host system having a communications link to the ACE 100, such as a wireless network link, as shown in FIG. 1*a*. In order to avoid potential tampering of the silverware as it is moved to/from off-chip memory and/or the potential of unauthorized users accessing the silverware, the present invention provides an approach for securing the data being moved.

Figure 5:
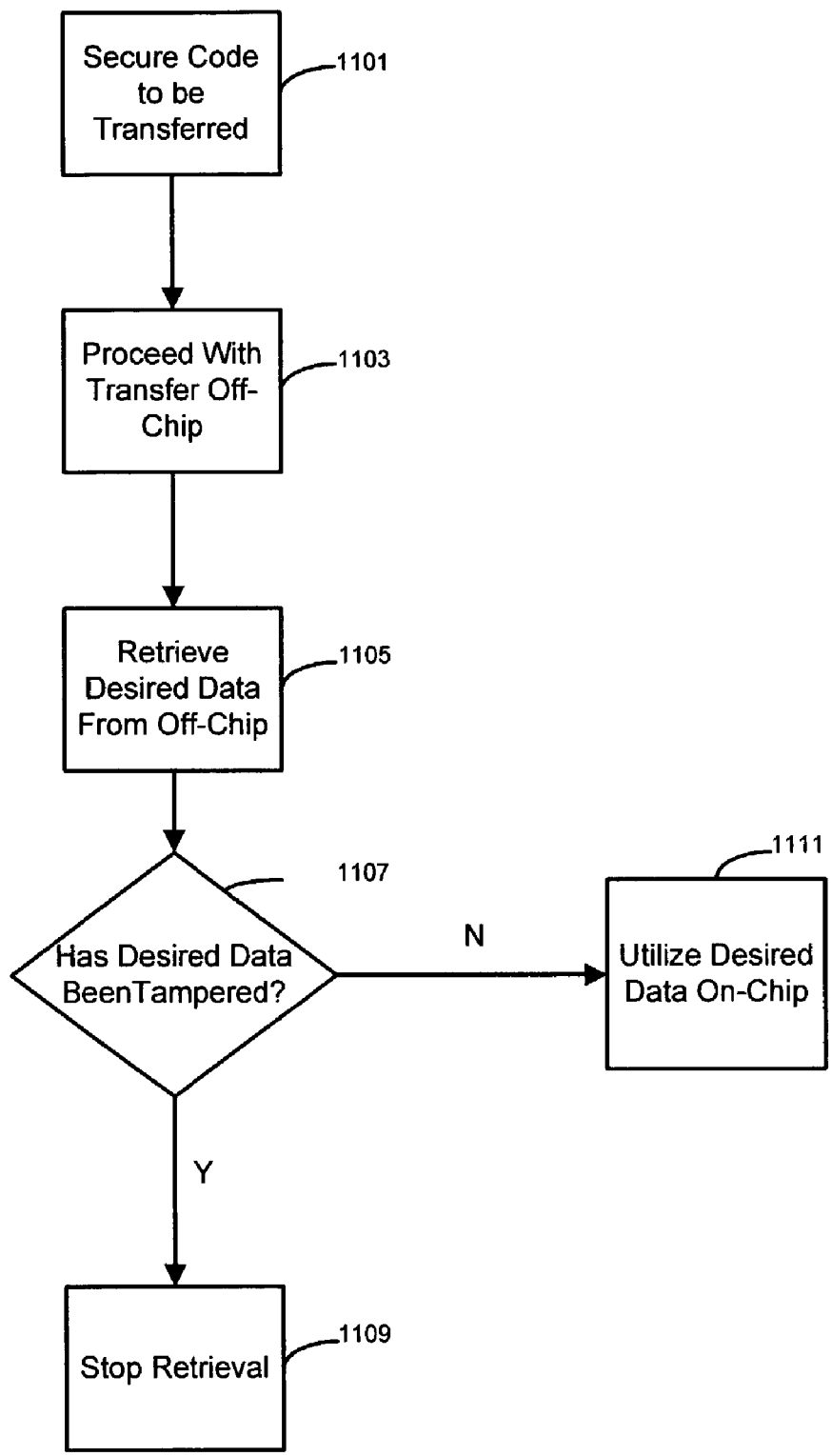
FIG. 5 illustrates a block flow diagram of a method for performing secure transfer of program code, i.e., silverware, from chip program memory to off-chip storage in accordance with the present invention.

Referring now to FIG. 5, a block flow diagram illustrates a method for performing secure transfer of program code, i.e., silverware, from chip program memory to off-chip storage. In a preferred embodiment, the silverware that requires transfer is encrypted and hashed (step 1101). The encryption key and hash data may be retained within the ACE 100, e.g., in non-volatile storage on-chip. By way of example, SHA-MDC may be used as the encryption algorithm, but, other algorithms capable of performing sufficient encryption may be chosen according to particular design preferences, as is well understood in the art. The use of the encryption acts as a preventative step against the possibility of unauthorized access to the silverware in the off-chip storage.

Once encrypted, the transfer proceeds (step 1103). In a preferred embodiment, segmentation of the silverware occurs for the encryption and transfer process. The particular size of the segments/blocks of data may be chosen as desired. For example, the block size may be based on a chosen fixed block size. Alternatively, the size of the blocks may be based on the functions and subroutines of the code. As a further alternative, the block size may be based on the types of modules in the ACE 100, where the subroutines associated with each of the modules determines how the segments are separated.

When program code from the off-chip memory is retrieved back into the ACE 100 memory (step 1105), the process continues by decrypting and verifying the hash of the data before loading is completed (step 1107). If the hash of the decrypted data does not match the stored hash, then the loading is stopped (step 1109). If the hash does match, then the loading is continued and the ACE 100 is able to use the data (step 1111). In this manner, any modification that may have occurred to the data while off-chip/on the host can be detected and potential detrimental use of that modified data is successfully avoided.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A system to securely store a program code of an embedded system, the system comprising:
   a configurable integrated circuit, the configurable integrated circuit comprising:
      a memory to store a digitation file, the digitation file comprising a tightly coupled interdigitated stream comprising configuration information and data to be processed, wherein the memory includes an adaptive silicon foundation, and wherein the digitation file, when applied to the adaptive silicon foundation, provides a hardware designation and software application for the adaptive silicon foundation,
      a plurality of computational elements, and
      an interconnection network, the interconnection network adapted to configure the plurality of computational elements in response to the configuration information to perform any one of a plurality of algorithms in response to the configuration information; and
   computer readable medium storage external to the configurable integrated circuit for receiving a plurality of segmented encrypted digitation files from the configurable integrated circuit, each of the plurality of segmented encrypted digitation files including one or more of the algorithms,
   wherein the configurable integrated circuit is further adapted to:
      encrypt each of the digitation files and hash each of the digitation files to form hash data,
      separate each of the encrypted digitation files into a set of data blocks, wherein a size of the data blocks is based on the functions and subroutines included in the encrypted digitation file and is further based on module types associated with the modules included in the configurable integrated circuit,
      transfer each data block in the set of data blocks to the computer readable medium storage,
      retain an encryption key and the hash data in on-chip memory,
      retrieve a selected one of the segmented digitation files from the computer readable medium storage,
      decrypt on-chip the retrieved segmented encrypted digitation file and hash the decrypted digitation file, and
      when the hash data of the decrypted digitation file matches the retained hash data, separate the decrypted digitation file into a set of data blocks, wherein the size of the data blocks is based on the functions and subroutines included in the decrypted digitation file and is further based on module types associated with the modules included in the configurable integrated circuit, and provide the configuration information of the retrieved segmented digitation file to the interconnection network to configure the plurality of computational elements into one of a plurality of modes of operation to process the coupled data of the retrieved digitation file according to an algorithm in the retrieved segmented digitation file.

2. The system of claim 1 wherein the computer readable medium storage further comprises storage of a host computer system.

3. The system of claim 1 wherein the configurable integrated circuit further verifies the digitation file data when retrieved from the computer readable medium storage before utilization.

4. The system of claim 3 wherein the configurable integrated circuit decrypts and hashes the retrieved digitation file data and halts use of the retrieved digitation file data when the hash data of the retrieved digitation file data does not match the hash data of the transferred digitation file.

5. The system of claim 4 wherein the digitation file further comprises data, and wherein configurable integrated circuit proceeds with digitation file data use when the hash of the returned digitation file data matches the hash of the transferred digitation file date.

6. A system as claimed in claim 1 wherein the modes of operation comprise differing calculations, algorithms or processing functions to support any one of a plurality of differing types of computational units.

7. The system as claimed in claim 6 wherein the types of units include linear operations, non-linear operations, format state machines, memory management and digitation level manipulation.

8. A system as claimed in claim 1, wherein the coupled data is processed within the next two processor cycles.

9. A method for securely transferring program code of a configurable integrated circuit in an embedded system from an off chip distribution source to an on chip memory of an adaptive computing engine which is operable in a plurality of different modes, the configurable integrated circuit comprising the memory, a plurality of computational elements and an interconnection network, the interconnection network adapted to configure the plurality of computational elements to execute one of a plurality of different modes of operation in response to the configuration information, the method comprising:

encrypting a digitation file at the configurable integrated circuit, the digitation file comprising configuration information for a selected one of the modes of the configurable integrated circuit and coupled data to be executed by the integrated circuit upon being configured according to the mode, wherein the memory includes an adaptive silicon foundation, and wherein the digitation file, when applied to the adaptive silicon foundation, provides a hardware designation and software application for the adaptive silicon foundation;

hashing the digitation file on chip to form hash data;

separating the digitation file into a set of data blocks, wherein a size of the data blocks is based on the functions and subroutines included in the digitation file and is further based on module types associated with the modules included in the configurable integrated circuit;

transferring the encrypted and separated digitation file to a data storage device, the data storage device receiving and storing a plurality of different encrypted and separated digitation files from the configurable integrated circuit, and retaining an encryption key and the hash data in the on chip memory;

the configurable integrated circuit retrieving the encrypted and separated digitation file from the off chip data storage device and decrypting the encrypted and separated digitation file in response to a received command;

hashing the decrypted digitation file; and when the hash data of the decrypted digitation file matches the retained hash data, separating the decrypted digitation file into a set of data blocks, wherein the size of the data blocks is based on the functions and subroutines included in the decrypted digitation file and is further based on module types associated with the modules included in the configurable integrated circuit, and providing configuration from the decrypted digitation file information to the interconnection network to configure the plurality of computational elements into one of the plurality of modes of operation as defined by the decrypted digitation file to process the coupled data of the decrypted digitation file according to the one mode of operation, whereby the configurable integrated circuit is protected from tampered digitation file data.

10. The method of claim 9 further comprising utilizing algorithms within the configurable integrated circuit for encrypting and hashing digitation file data being moved from the memory to the data storage device.

11. The method of claim 10 further comprising utilizing algorithms within the configurable integrated circuit for decrypting and hashing the digitation file data retrieved from the data storage device.

12. The method of claim 11 further determining within the configurable integrated circuit whether the hash data of the retrieved digitation file data matches the retained hash data of the digitation file, and halting use of the retrieved digitation file data when the hash does not match.

13. The method of claim 9 wherein the step of transferring comprises transferring the digitation file data as segmented blocks of program code.

14. The method of claim 9, including repeating the steps of retrieving, hashing and processing at the same configurable integrated circuit for a plurality of the different modes of operation as defined by the hashed digitation files.

15. A system as claimed in claim 9, wherein the coupled data is processed within the next two processor cycles.

* * * * *